United States Patent
Baer et al.

(10) Patent No.: US 10,985,620 B2
(45) Date of Patent: Apr. 20, 2021

(54) DEVICES TO BE USED AS MAGNETS

(71) Applicant: ACCELERATED SYSTEMS INC., Waterloo (CA)

(72) Inventors: Stanley Baer, Kitchener (CA); Tim Lambert, Guelph (CA); Willem Jager, Cambridge (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 0 days.

(21) Appl. No.: 16/297,915

(22) Filed: Mar. 11, 2019

(65) Prior Publication Data

US 2019/0288569 A1 Sep. 19, 2019

Related U.S. Application Data

(60) Provisional application No. 62/642,701, filed on Mar. 14, 2018.

(51) Int. Cl.
| | |
|---|---|
| *H02K 1/27* | (2006.01) |
| *H02K 1/02* | (2006.01) |
| *H01F 1/057* | (2006.01) |
| *H01F 7/02* | (2006.01) |
| *H02K 21/22* | (2006.01) |

(52) U.S. Cl.
CPC ............ *H02K 1/02* (2013.01); *H01F 1/057* (2013.01); *H01F 7/02* (2013.01); *H02K 1/2786* (2013.01); *H02K 21/22* (2013.01); *H02K 2213/03* (2013.01)

(58) Field of Classification Search
CPC .... H02K 1/2766; H02K 1/278; H02K 1/2753; H01F 7/021
See application file for complete search history.

(56) References Cited

U.S. PATENT DOCUMENTS

| | | | |
|---|---|---|---|
| 6,025,667 A | 2/2000 | Narita et al. | |
| 8,400,038 B2* | 3/2013 | Smith | H01F 7/0278 310/156.07 |
| 8,823,235 B2* | 9/2014 | Watanabe | H02K 1/2793 310/156.32 |
| 8,901,794 B2* | 12/2014 | Siegfriedsen | H02K 1/2753 310/156.08 |

(Continued)

FOREIGN PATENT DOCUMENTS

| | | |
|---|---|---|
| CN | 203166649 U | 8/2013 |
| CN | 204046382 U | 12/2014 |

(Continued)

*Primary Examiner* — Dang D Le
(74) *Attorney, Agent, or Firm* — Nyssa Inc.

(57) ABSTRACT

There is provided a device to be used as a magnet. The device comprises a first member, a second member, and a third member. The first member defines a trench extending along a longitudinal direction. The trench has a top being open. Moreover, the first member comprises a first material being magnetizable. The second member is received in the trench and secured to the first member. The second member comprises a second material being magnetizable. Furthermore, the third member is received in the trench and secured to the first member. The third member comprises a third material being magnetizable. The third member and the second member are disposed side-by-side along the longitudinal direction.

20 Claims, 13 Drawing Sheets

(56) References Cited

U.S. PATENT DOCUMENTS

| | | | | |
|---|---|---|---|---|
| 2004/0169575 A1* | 9/2004 | Knauff | ............... | H02K 1/278 |
| | | | | 335/302 |
| 2015/0171679 A1 | 6/2015 | Nishiyama et al. | | |
| 2015/0295457 A1* | 10/2015 | Yamada | ............... | H02K 1/243 |
| | | | | 310/156.07 |

FOREIGN PATENT DOCUMENTS

| | | |
|---|---|---|
| CN | 105322744 A | 2/2016 |
| CN | 105337434 A | 2/2016 |
| CN | 105356704 A | 2/2016 |
| CN | 205021546 U | 2/2016 |
| CN | 205051546 U | 2/2016 |
| CN | 106340367 A | 1/2017 |
| JP | 2002110411 A | 4/2002 |
| KR | 20130013011 A | 2/2013 |
| WO | 2014064351 A1 | 5/2014 |

\* cited by examiner

DEVICES TO BE USED AS MAGNETS

CROSS-REFERENCE TO RELATED APPLICATION

This application claims priority from U.S. Provisional Patent Application No. 62/642,701, filed on Mar. 14, 2018, which is incorporated herein by reference in its entirety.

FIELD

The present specification relates to devices to be used as magnets, and in particular to devices to be used as magnets in electric motors.

BACKGROUND

Electric motors may be used to convert electrical energy into mechanical energy. Some electric motors may have a rotor and a stator. Moreover, electric motors may use a combination of electromagnets and permanent magnets to cause the rotor to rotate relative to the stator.

SUMMARY

According to an implementation of the present specification there is provided a device to be used as a magnet, the device comprising: a first member defining a trench extending along a longitudinal direction, the trench having a top being open, the first member comprising a first material being magnetizable; a second member secured to the first member, the second member received in the trench, the second member comprising a second material being magnetizable; and a third member secured to the first member, the third member received in the trench, the third member comprising a third material being magnetizable, the third member and the second member disposed side-by-side along the longitudinal direction.

The trench may comprise a width measured along a direction lateral to the longitudinal direction; and the second member and the third member may span the width of the trench.

The second material and the third material may have magnetic coercivities larger than a corresponding magnetic coercivity of the first material.

The second material may be the same as the third material.

The first material may comprise ferrite; and the second material and the third material may comprise NdFeB.

The device may be free of a direct electrically-conductive link between the second member and the third member.

The second member may abut the third member in the longitudinal direction.

The device may further comprise at least one additional member secured to the first member, the at least one additional member received in the trench, the at least one additional member comprising a corresponding additional material being magnetizable, the at least one additional member disposed side-by-side along the longitudinal direction with the second member and the third member.

The trench may comprise a bottom opposite the top, the bottom being substantially planar; the second member may comprise a substantially planar surface abutting the bottom; and the third member may comprise a corresponding substantially planar surface abutting the bottom.

The trench may comprise: a width measured along a first direction lateral to the longitudinal direction; a bottom opposite the top; and a depth measured between the top and the bottom along a second direction; and a thickness of the first member measured along the second direction may increase when moving from a first point at a lateral edge of the first member along the first direction towards a second point, a distance of the second point to the trench measured along the first direction being smaller than a corresponding distance of the first point to the trench measured along the first direction.

The first member may comprise a plurality of segments disposed side-by-side along the longitudinal direction.

According to another implementation of the present specification there is provided an electric motor comprising: a rotor to rotate about an axis of rotation defining an axial direction, the rotor comprising a backiron and a plurality of magnets secured to an inner surface of the backiron, at least one of the magnets comprising: a first member defining a trench extending along a longitudinal direction, the trench having a top being open and a bottom opposite the top, the bottom being proximal to the inner surface and the top being distal from the inner surface, the first member comprising a first material being magnetizable; a second member secured to the first member, the second member received in the trench, the second member comprising a second material being magnetizable; and a third member secured to the first member, the third member received in the trench, the third member comprising a third material being magnetizable, the third member and the second member disposed side-by-side along the longitudinal direction. The electric motor also comprises a stator disposed inside the rotor and centered about the axis of rotation, the stator comprising a plurality of teeth each extending radially towards the inner surface of the backiron and terminating in a corresponding tooth end disposed proximal to the inner surface; and a plurality of conductive windings each disposed around a corresponding tooth of the stator.

The trench may comprise a width measured along a direction lateral to the longitudinal direction; and the second member and the third member may span the width of the trench.

The second material and the third material may have magnetic coercivities larger than a corresponding magnetic coercivity of the first material.

The first material may comprise ferrite; and the second material and the third material may comprise NdFeB.

The at least one of the magnets may be free of a direct electrically-conductive link between the second member and the third member.

The second member may abut the third member in the longitudinal direction.

The longitudinal direction may be about parallel to the axial direction.

A radial projection of a given tooth end on the inner surface of the backiron may have a width in a circumferential direction that is smaller than a corresponding width of the second member and the third member measured along a direction lateral to the longitudinal direction.

A radial projection of a given tooth end on the inner surface of the backiron may have a width in a circumferential direction that is smaller than a gap measured in the circumferential direction between the second member and the third member of the at least one of the magnets and a corresponding second member and a corresponding third member of a further magnet secured to the inner surface of the backiron adjacent to the at least one of the magnets.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Some types of electric motors such as brushless electric motors may utilize permanent magnets to produce a rotating magnetic field which does not require electrical power. The rotation of these magnets, and of the field which they produce, causes power to be dissipated in the motor's stator due to the variation in the amplitude of the magnetic field applied to a particular stator region. The arrangement of these magnets may furthermore permit the field generated by the stator to cause variation in the amplitude of the magnetic field applied to a particular rotor region. The combination of these two effects may reduce the efficiency of the energy conversion process in the motor. Changes to the shape, size, material, and relative location of the magnets, and changes to the shape, size, and material of the stator, and other alterations to the magnet or motor design may be used to reduce this efficiency-reducing impact.

Figure 1:
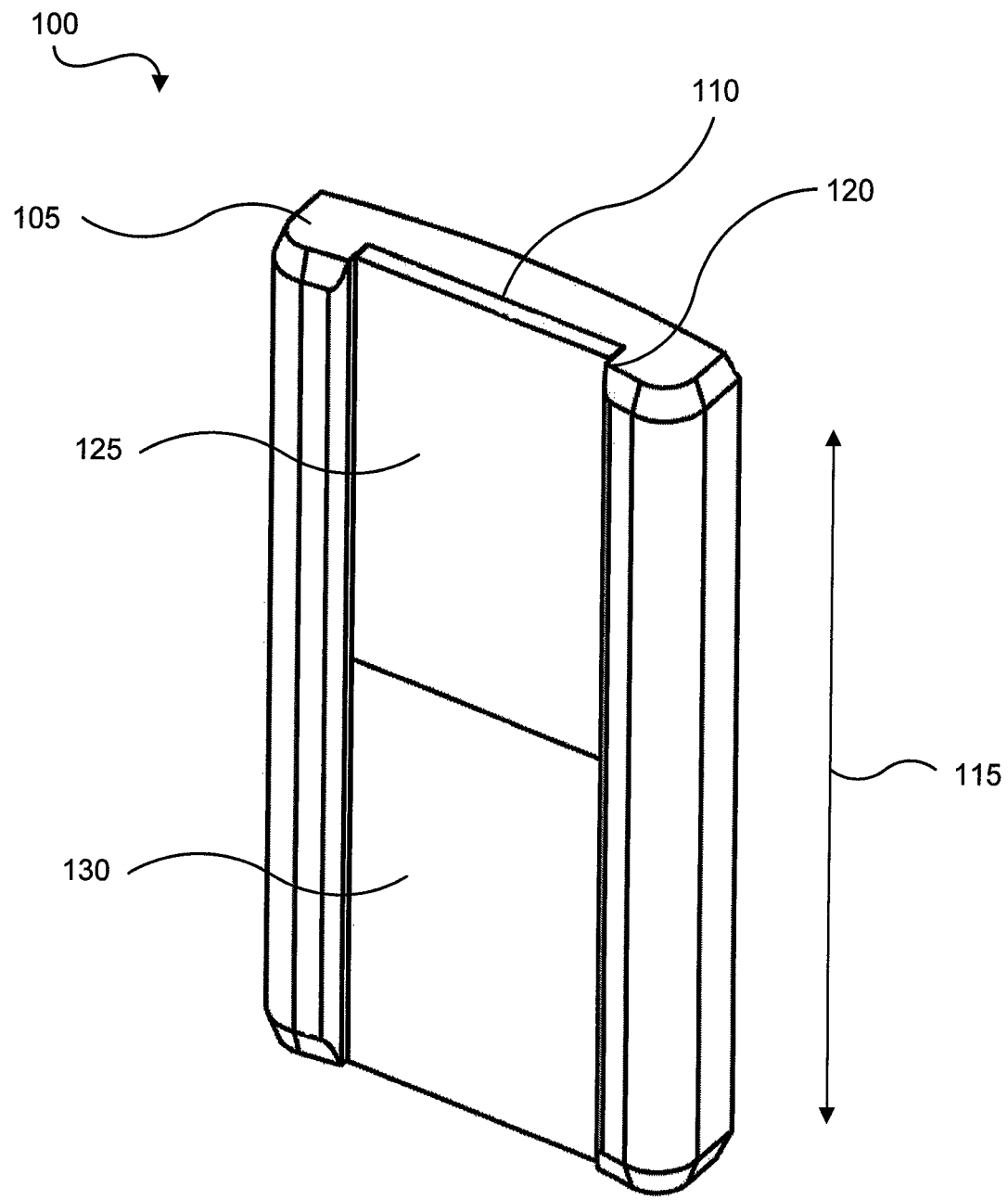
FIG. 1 shows a top perspective view of an example device which may be used as a magnet, in accordance with a non-limiting implementation of the present specification.

One particular alteration to the design of the motor which may reduce the amount of power dissipated in the rotor and the stator is the usage of permanent magnet materials with a relatively low electrical conductivity. These materials may permit less electrical current to circulate in the rotor components, and may also generate less variation in the amplitude of the magnetic field applied to the stator by the rotor. Many of these low-conductivity materials do, however, also possess low magnetic coercivities and low remanent magnetic flux densities. High coercivity and remanent flux density are indicative of a high energy density magnet which may be used to produce a motor with a higher power density, while the opposite is true of a magnet with a low coercivity and a low remanent flux density. FIG. 1 shows an example device 100 which may be used as a magnet having relatively high coercivity and relatively high remanent flux density, while also having relatively low electrical conductivity.

FIG. 1 shows a top perspective view of device 100, which comprises a first member 105 defining a trench 110 extending along a longitudinal direction 115. Trench 110 may also be described as a channel. In addition, longitudinal direction 115 may be used to describe one or both of the directions indicated by the corresponding two-headed arrow shown in FIG. 1. Trench 110 may have a top 120 which is open. Member 105 may comprise a material that is magnetizable. This in turn may allow member 105 to become magnetized and to be used as a permanent magnet.

In addition, device 100 comprises a second member 125 and a third member 130 secured to member 105. Members 125 and 130 are received in trench 110. In some examples, being received in trench 110 may secure members 125 and 130 to member 105. Moreover, in some examples members 125 and 130 may be received in trench 110, and adhesives, fasteners, or other securing methods or mechanism may be used to secure members 125 and 130 to member 105.

Second member 125 may comprise a second material which is magnetizable. Similarly, third member 130 may comprise a third material which is magnetizable. In this manner, members 125 and 130 may be magnetized and may be used as permanent magnets. In some examples, the second material may be the same as the third material. Furthermore, in some examples members 125 and 130 may have the same material composition.

In some examples, the second material and the third material may have magnetic coercivities larger than a corresponding magnetic coercivity of the first material. As such, once magnetized, device 100 may be able to act as a hybrid magnet providing a low coercivity magnet in member 105 and providing high coercivity magnets in members 125 and 130. In some examples, member 105 may comprise ferrite and members 125 and 130 may comprise NdFeB. Moreover, in some examples, member 105 may comprise a magnetically-hard ferrite.

As shown in FIG. 1, second member 125 and third member 130 are disposed side-by-side along longitudinal direction 115. In other words, members 125 and 130 are stacked, positioned sequentially. or positioned one beside the other in longitudinal direction 115. While FIG. 1 shows members 125 and 130 as abutting or touching one another in the longitudinal direction, it is contemplated that in some examples members 125 and 130 may be spaced from one another in longitudinal direction 115, or may be separated from one anther in longitudinal direction 115 by a spacer.

As discussed above, members 125 and 130 may comprise materials with high magnetic coercivities, and once magnetized may act as high coercivity magnets. As such, in device 100 the high coercivity component is divided into two segments, i.e. members 125 and 130. Dividing the high coercivity component into multiple segments may reduce electrical conductance in the high coercivity component along longitudinal direction 115.

While in FIG. 1 the dividing boundary between members 125 and 130 is along the straight edges of members 125 and 130, which edges are oriented about perpendicularly to longitudinal direction 115, it is contemplated that in some examples the boundary between members 125 and 130 need not be straight nor to be oriented perpendicularly to the longitudinal direction. For example, the boundary may be curved, zigzag, stepped, slanted, and the like.

In order to maintain the reduction in electrical conductance in the high coercivity component in longitudinal direction 115, in some examples device 100 may be free of a direct electrically-conductive link between second member 125 and third member 130. Examples of such direct electrically-conductive links may include bridges or connectors formed integrally with or between members 125 and 130, welds or solder quantities electrically connecting members 125 and 130, wires or other electrical connectors between members 125 and 130, and the like.

Moreover, while FIG. 1 shows members 125 and 130 as having the same shape and size as one another, it is contemplated that in some examples members 125 and 130 may have shapes, sizes, compositions, electrical properties, or magnetic properties that are different from one another. Furthermore, in some examples device 100 may comprise more than two members received in trench 110 and disposed side-by-side along longitudinal direction 115. Furthermore, it is contemplated that in some examples member 105 may have a shape or size different than those shown in FIG. 1.

Figure 2:
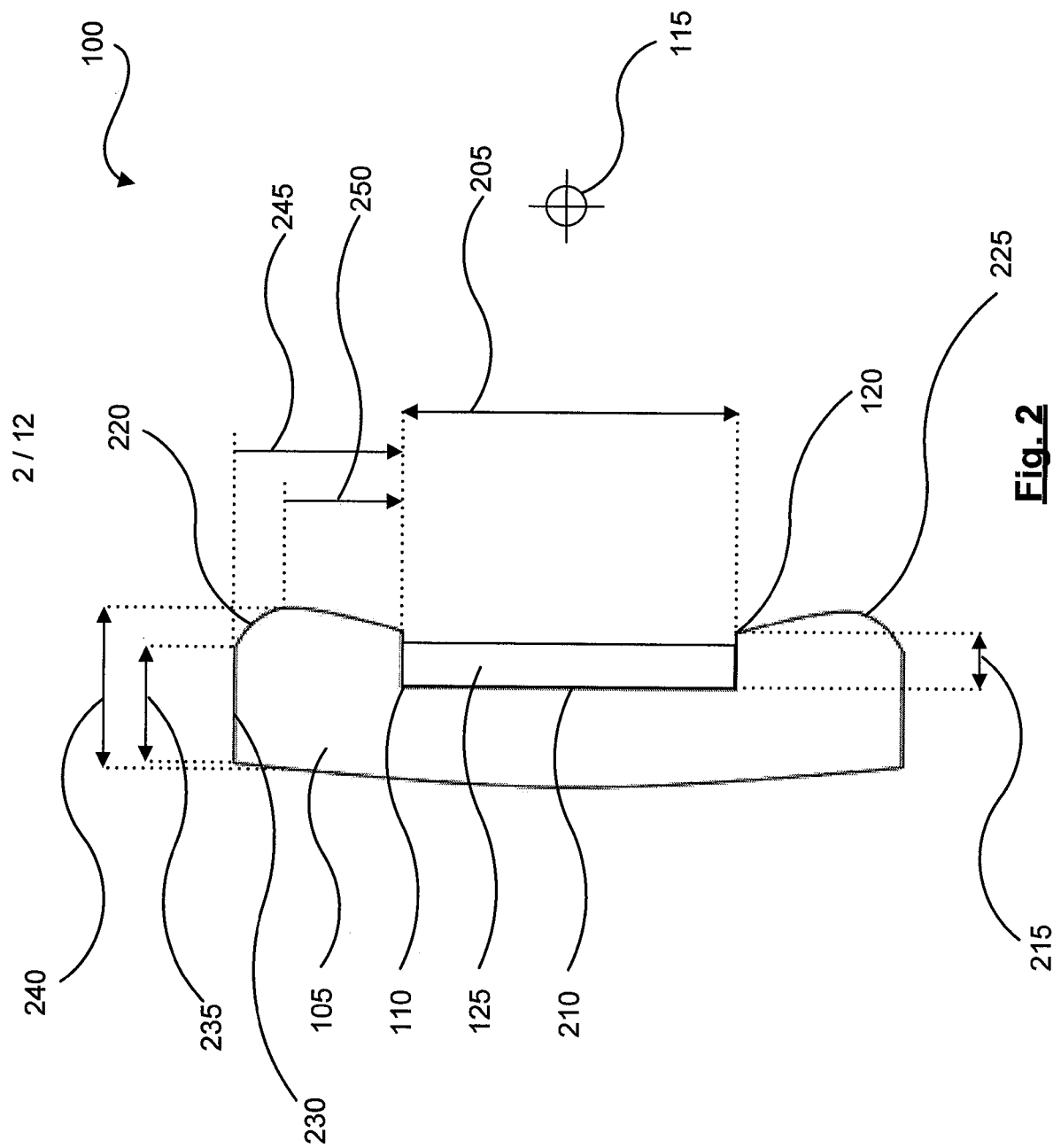
FIG. 2 shows a top plan view of the device of FIG. 1.

Turing now to FIG. 2, a top plan view is shown of device 100. Trench 110 comprises a width 205 measured along a direction lateral to longitudinal direction 115. This lateral direction is shown by the arrow associated with width 205 in FIG. 2. Second member 125 and third member 130 (not visible in FIG. 2) span width 205 of trench 110. It is contemplated that in some examples, the second and third members received in the trench may have respective widths smaller than width 205, such that the second and third members may fall short of spanning width 205 of trench 110.

Moreover, as shown in FIG. 2, trench 110 may have a bottom 210 opposite top 120. While bottom 210 is shown as being substantially planar in FIG. 2, it is contemplated that in some examples the bottom of the trench may have a shape other than planar. For example, the trench bottom may be U-shaped, V-shaped, and the like. Furthermore, it is contemplated that in some examples the trench itself may have a cross-sectional shape that is different than rectangular; for example, the trench may have a cross-sectional shape that is triangular, U-shaped, and the like. In device 100, members 125 and 130 each comprise a substantially planar surface that is adjacent to and abutting bottom 210. It is contemplated that in some examples members 125 and 130 may have non-planar surfaces that are shaped to abut against a complementarily-shaped bottom of the trench, or may have different shapes.

Furthermore, a depth 215 may be measured between top 120 and bottom 210 of trench 110 along a second direction indicated by the arrow associated with depth 215 in FIG. 2. FIG. 2 shows that depth 215 of trench 110 may be larger than a height of member 125, such that member 125 abuts against bottom 210 but does not reach top 120 of trench 110. It is contemplated that in some examples, the members received in the trench may have a height that is the same as or greater than the depth of the trench.

In addition, as shown in FIG. 2, member 105 has rounded corners 220 and 225. The use of rounded corners reduces the use of sharp corners which may be more susceptible to being demagnetized when device 100 is magnetized and in operation as a magnet. In some examples, the corners need not be rounded, and may be cut-off, truncated, or otherwise shaped to reduce the sharpness of the corners.

In other words, member 105 may be shaped to have its thickness, measured along the direction indicated by the arrow associated with depth 215, increase when moving from a lateral edge 230 of member 105 towards trench 110. For example, a thickness 235 of member 105 at lateral edge 230 may be smaller than a thickness 240 measured at a point closer to trench 110 than lateral edge 230. FIG. 2 shows that a distance 245 of lateral edge 230 to trench 110 is larger than a distance 250 to trench 110 at which point thickness 240 is measured. As shown in FIG. 2, distances 245 and 250 may be measured along the direction indicated by the arrow associated with width 205.

In FIG. 2, the thickness of member 105 increases from lateral edge 230 towards trench 110 up to the point where thickness 240 is measured, and then the thickness decreases when progressing further towards trench 110. It is contemplated that in other examples the thickness may vary as a function of distance from the trench in a manner different than that shown in FIG. 2. Moreover, while FIG. 2 shows member 105 having rounded corners 220 and 225, it is contemplated that in some examples member 105 may have a different number or combination of its corners rounded, or may have sharp corners.

Figure 3:
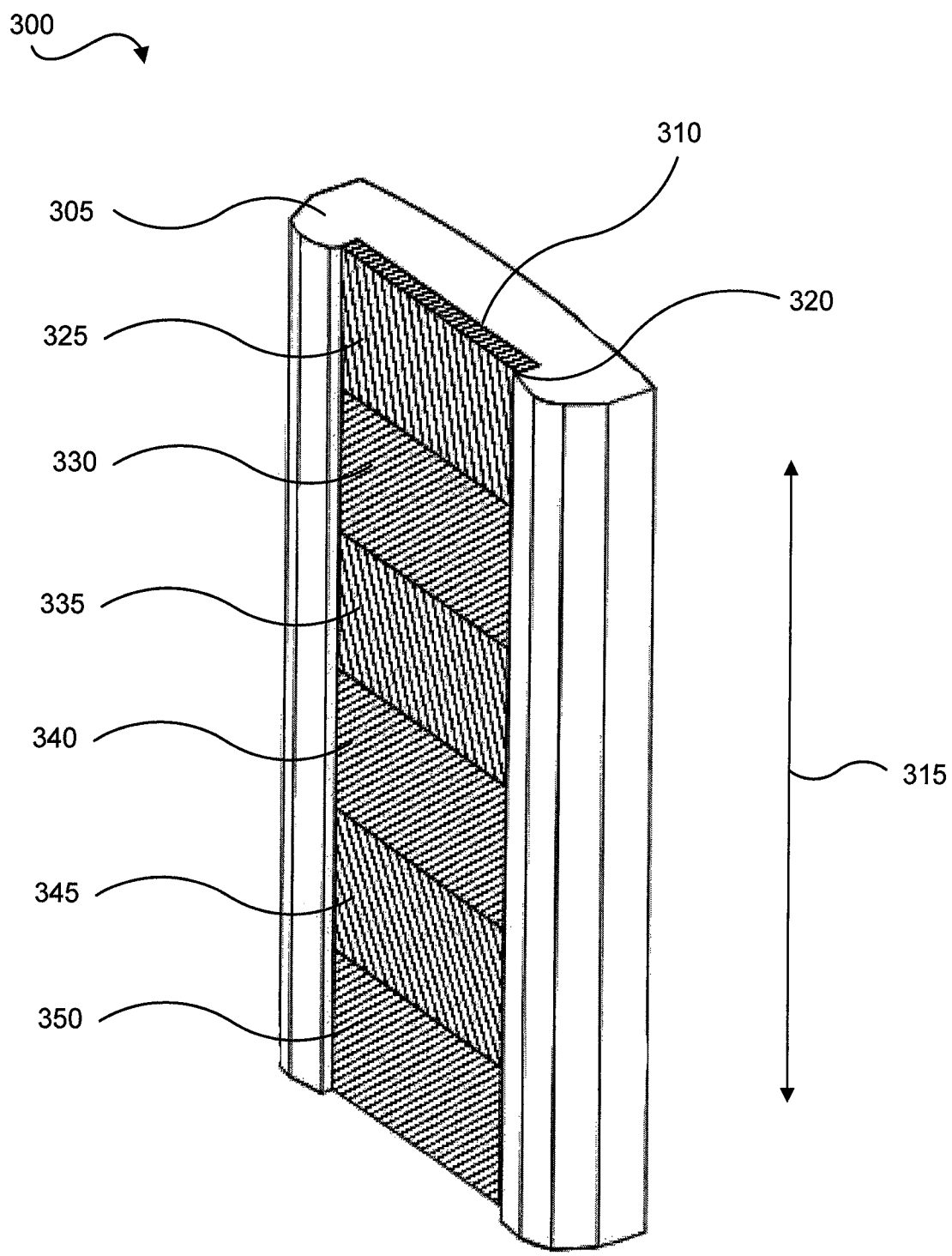
FIG. 3 shows a top perspective view of another example device which may be used as a magnet, in accordance with a non-limiting implementation of the present specification.

As discussed above, in some examples device 100 may further comprise at least one additional member secured to first member 105, which additional member may be received in trench 110. The additional member may comprise a corresponding additional material being magnetizable, and the additional member may be disposed side-by-side along longitudinal direction 115 with second member 125 and third member 130. For example, FIG. 3 shows a top perspective view of an example device 300, which may be similar to device 100. One difference between device 300 and device 100 is that device 300 comprises six members received in the trench.

Turning now to FIG. 3, device 300 comprises a first member 305, which defines a trench 310 extending along a longitudinal direction 315. Trench 310 may have an open top 320. Members 325, 330, 335, 340, 345, and 350 may be received in trench 310 and may be secured to member 305. Moreover, members 325, 330, 335, 340, 345, and 350 may be disposed side-by-side along longitudinal direction 315. Furthermore, member 305 and members 325, 330, 335, 340, 345, and 350 may comprise respective materials that are magnetizable. This in turn may allow device 300 to be magnetized, and be used as a magnet.

Figure 4:
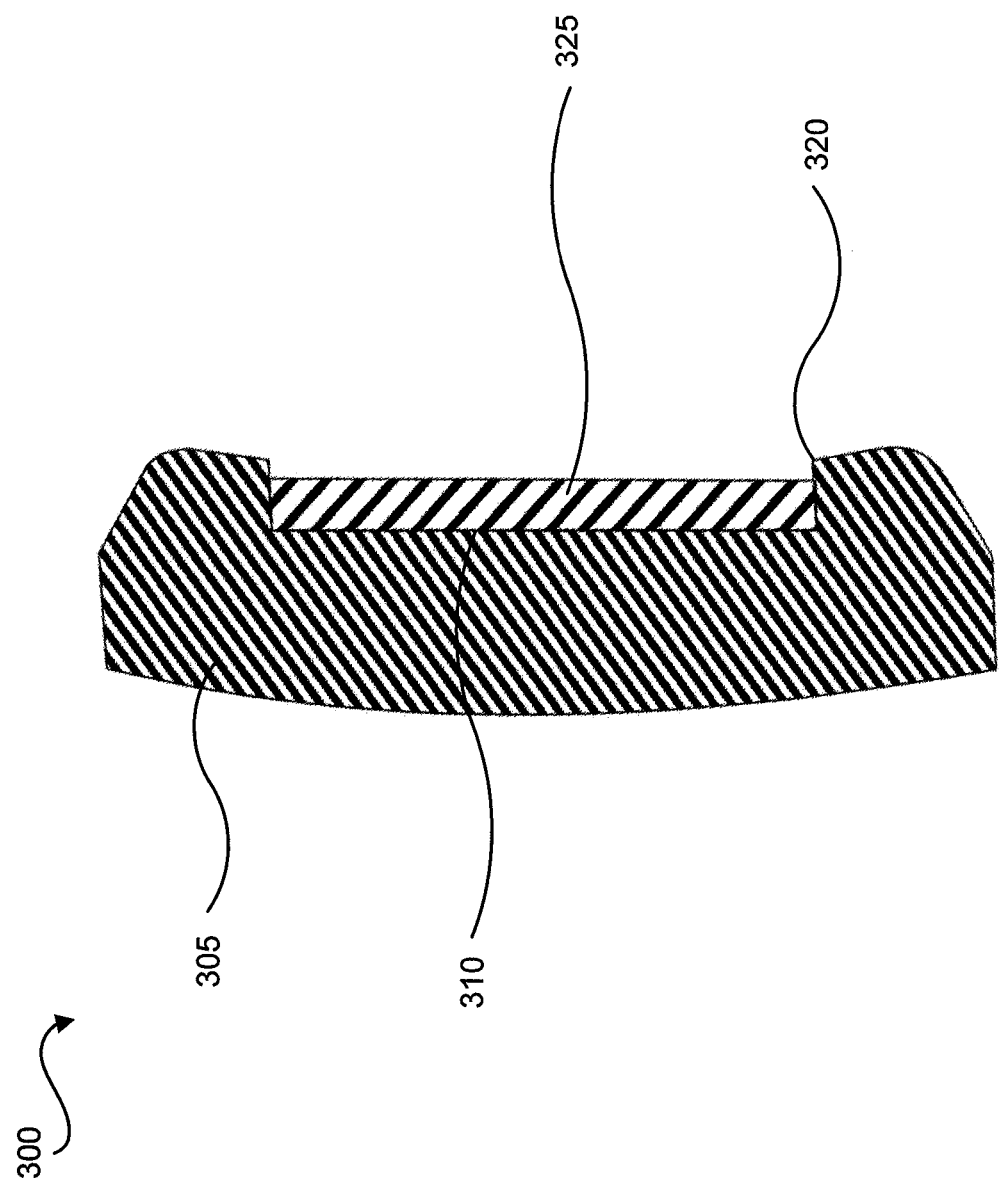
FIG. 4 shows a cross-sectional view of the device of FIG. 3.

In some examples, members 325, 330, 335, 340, 345, and 350 may have a magnetic coercivity larger than the magnetic coercivity of member 305. Moreover, while FIG. 3 shows members 325, 330, 335, 340, 345, and 350 as having the same size and shape as one another, it is contemplated that in some examples members 325, 330, 335, 340, 345, and 350 may have sizes, shapes, material compositions, or electric or magnetic properties that are different from one another. FIG. 4 shows a cross-sectional view of device 300.

Figure 5:
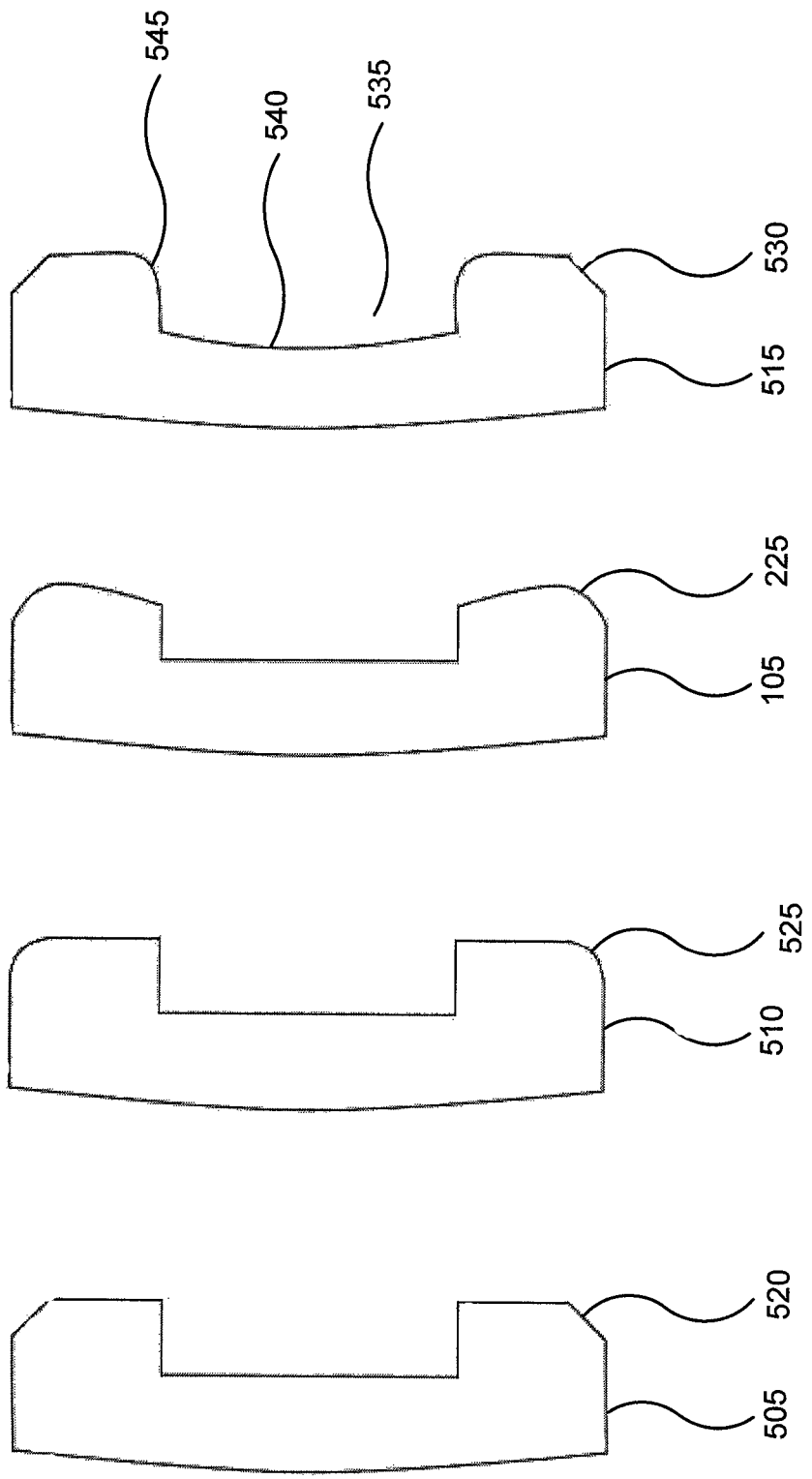
FIG. 5 shows top plan views of example members that may be used as part of a device which may be used as a magnet, in accordance with a non-limiting implementation of the present specification.

Turning now to FIG. 5, top plan views of example members 105, 505, 510, and 515 are shown. The latter three members may have a function and composition similar to member 105. One difference between members 505, 510, and 515 and member 105 is the shape of their outer perimeter. This outer perimeter may also be described as the cross-sectional shape of these members.

Member 505 comprises an angled or truncated corner 520. Member 510, in turn, comprises a rounded corner 525. Moreover, member 515 also comprises an angled or truncated corner 530, as well a trench 535 which comprises a curved bottom 540 and a rounded trench top corner 545. Changing the shape of the member defining the trench may be used to tailor the magnetic properties of the corresponding devices in which the members are used. In some examples, the shape of the member defining the trench may be tailored to reduce the total magnet-induced loss in an electric motor in which the devices described herein are used as permanent magnets.

Figure 13B:
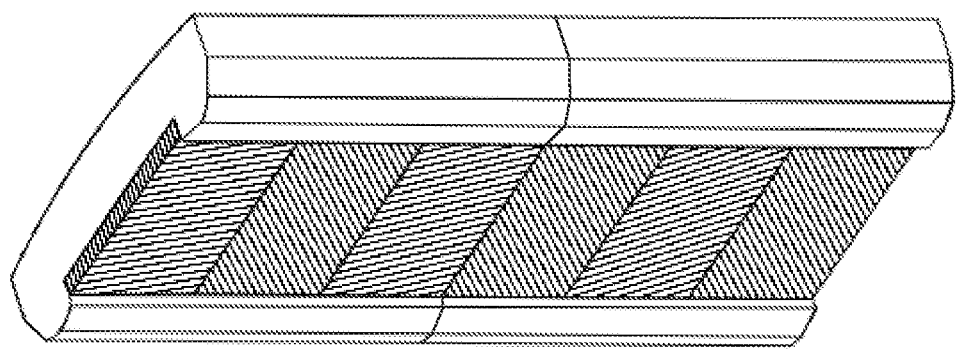
FIGS. 13A and 13B show top perspective views of example devices which may be used as magnets, in accordance with non-limiting implementations of the present specification.
Figure 13A:
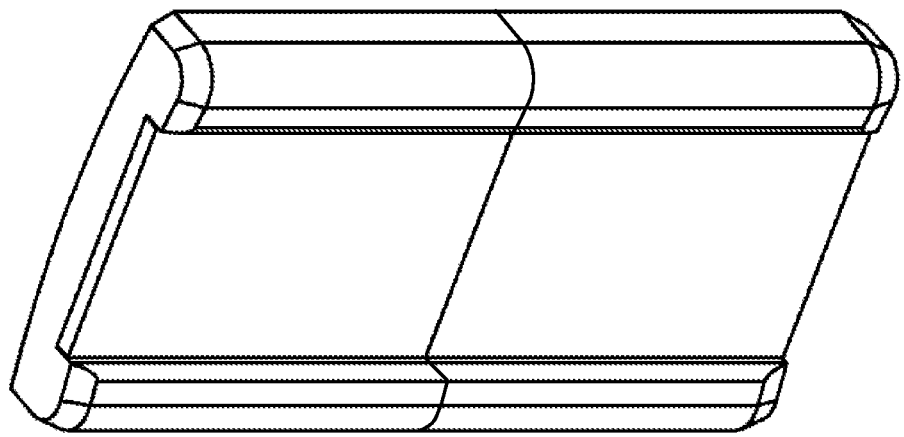

Furthermore, it is contemplated that in some examples the member defining the trench may itself also comprise a plurality of segments secured to one another and disposed side-by-side along the longitudinal direction defined by the trench. Two examples of such hybrid magnets are shown in FIGS. 13A and 13B. Moreover, in some examples where the member defining the trench comprises a plurality of segments, the number of the segments of the member defining the trench may be fewer than the number of members received in the trench.

Figure 6:
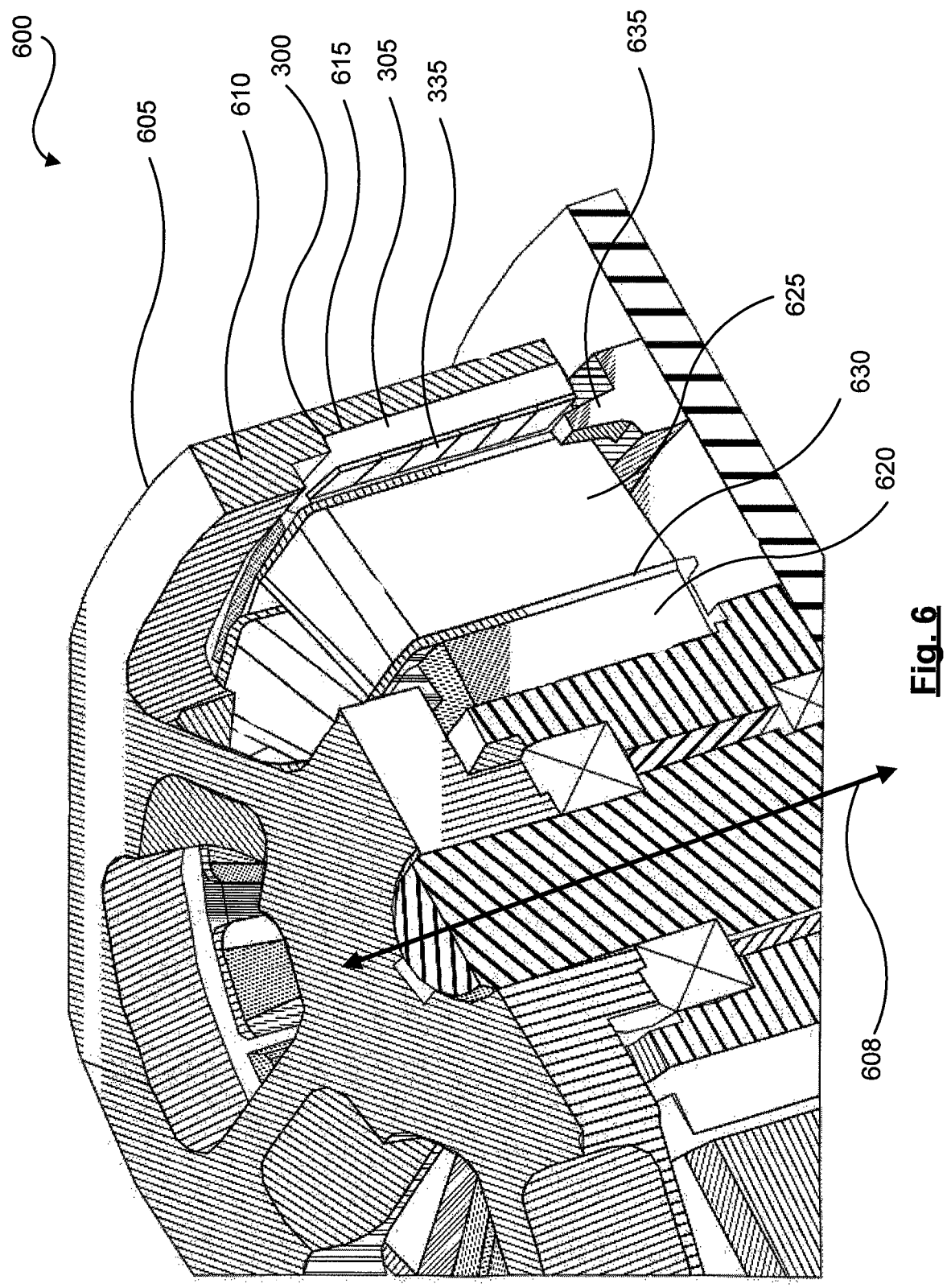
FIG. 6 shows a top perspective partial cutaway view of an example electric motor, in accordance with a non-limiting implementation of the present specification.

Turning now to FIG. 6, a top perspective partial cutaway view is shown of an example electric motor 600. Electric motor 600 comprises a rotor 605 to rotate about an axis of rotation 608. Axis of rotation 608 in turn defines an axial direction indicated by the arrow corresponding to axis of rotation 608 in FIG. 6. Rotor 605 comprises a backiron 610 and a plurality of devices 300 secured to an inner surface 615 of backiron 610. Devices 300 may be magnetized to act as permanent magnets in motor 600. Inner surface 615 may also be described as a proximal surface, as inner surface 615 is proximate to the teeth of a stator 620 of motor 600, as will be described in greater detail below. Moreover, in some examples backiron 610 may comprise a material such as ductile steel, and the like.

The trench in the first member of devices 300 opens away from inner surface 615 of backiron 610. In other words, the bottom of the trench is proximal to inner surface 615 and the top of the trench is distal from inner surface 615. In some examples, the longitudinal axis defined by the trench of devices 300 may be about parallel to the axial direction defined by axis of rotation 608.

Motor 600 also comprises a stator 620 disposed inside rotor 605 and centered about axis of rotation 608. Stator 620 comprises a plurality of teeth each extending radially to the axial direction towards inner surface 615 of backiron 610. The stator teeth are not directly visible in FIG. 6, as they are each covered by corresponding conductive windings. One such winding is a winding 625 shown in FIG. 6. An insulator 630 may electrically insulate winding 625 from its corresponding stator tooth.

In some examples, the insulator may comprise a bobbin. Moreover, in some examples the winding may be wound around the bobbin and then placed over the corresponding stator tooth. Furthermore, in some examples the bobbin may be placed over the corresponding tooth and the winding may then be wound on the bobbin.

Furthermore, motor 600 may also comprise a sensor 635 to sense the position or the direction of rotation of rotor 605 in relation to stator 620. In some examples, sensor 635 may comprise a Hall-effect sensor, or the like. Moreover, as shown in FIG. 6, in some examples sensor 635 may be secured to a portion of stator 620 and be at least partially disposed between the teeth of stator 620 and devices 300 secured to inner surface 615 of backiron 610. This positioning, in turn, may allow sensor 635 to change its state, i.e. to sense, the rotor moving and the direction of rotation. In some examples, the height along the axial direction to which sensor 635 extends between the teeth of the stator and the magnets of the rotor may be adjusted to tailor the sensing performance of sensor 635. Moreover, it is contemplated that in some examples motor 600 need not comprise sensor 635.

Figure 7:
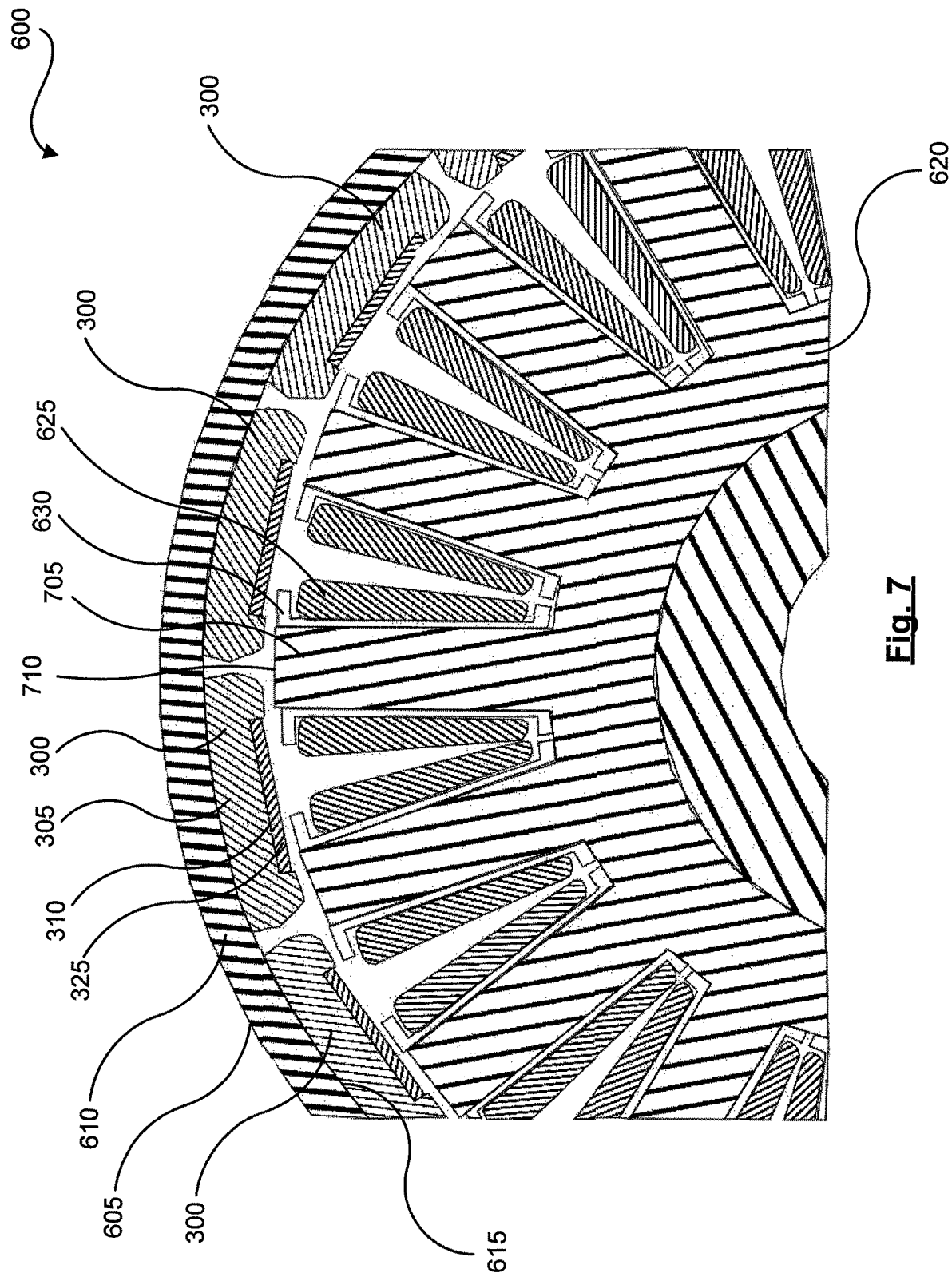
FIG. 7 shows a partial cross-sectional view of the motor of FIG. 6.

Turning now to FIG. 7, a partial cross-sectional view is shown of motor 600. This cross-section is made along a plane perpendicular to the axis of rotation. FIG. 7 shows a plurality of devices 300 secured to inner surface 615 of backiron 610 of rotor 605. As discussed above, devices 300 may be magnetized to act as permanent magnets in motor 600. Moreover, FIG. 7 shows a plurality of stator teeth extending radially towards inner surface 615 and devices 300. For ease and clarity of illustration, only one of these teeth, i.e. tooth 705, is numbered in FIG. 7. Tooth 705 terminates in a tooth end 710, which is disposed proximal to inner surface 615 and devices 300. The other stator teeth may have a structure and function similar to tooth 705.

Figure 8:
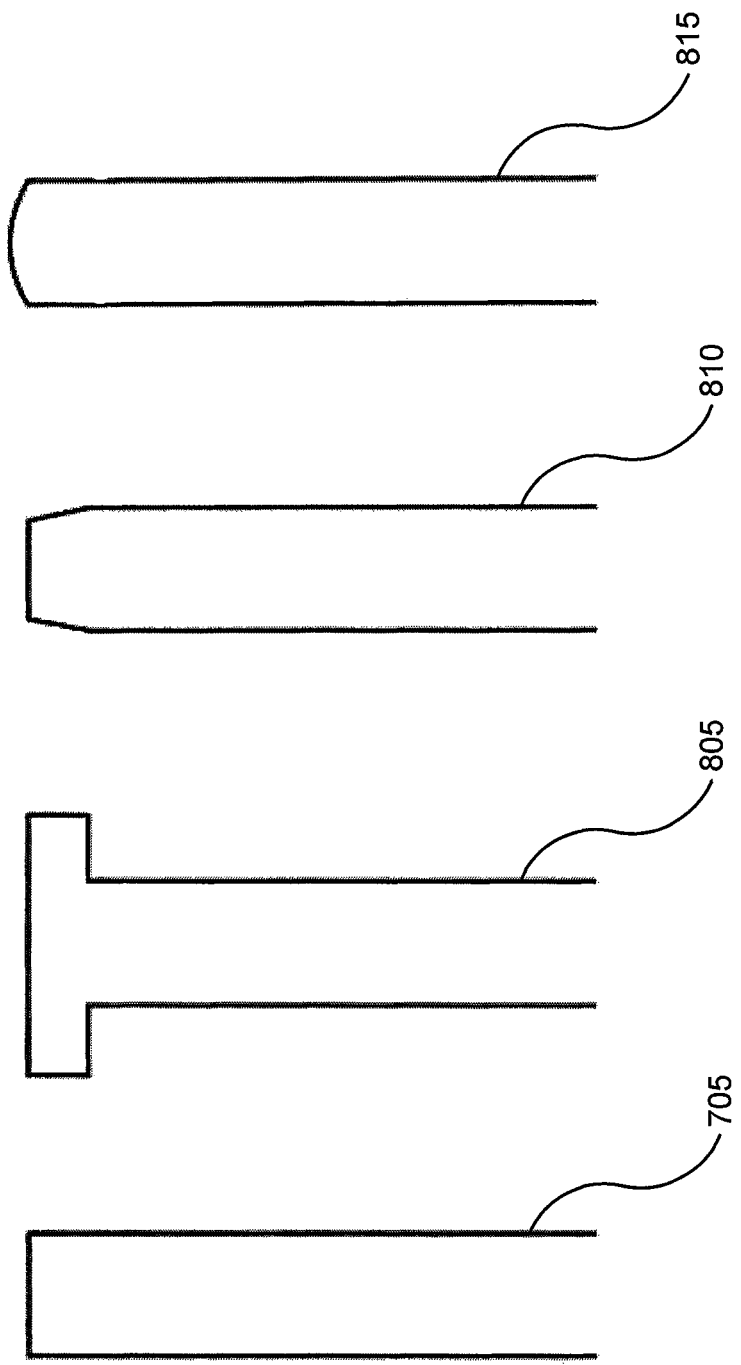
FIG. 8 shows top plan views of example stator teeth for an electric motor, in accordance with a non-limiting implementation of the present specification.

While FIG. 7 shows tooth 705 as having a rectangular shape, it is contemplated that the stator teeth may have different shapes. For example, FIG. 8 shows examples of a T-shaped tooth 805, a drafted shaped tooth 810, and a rounded shaped tooth 815. The shape of the stator teeth may be designed to tailor the magnetic properties of the stator and, in turn, the performance of the electric motor. It is contemplated that in some examples, the stator teeth may have shapes other than those shown in FIG. 8.

Referring back to FIG. 7, trench 310 in member 305 opens away from inner surface 615 and towards stator teeth ends of stator teeth, such as tooth end 710 of tooth 705. In this orientation, high coercivity members such as member 325 are positioned proximal to the ends of the stator teeth. In addition, in this orientation low coercivity members such as member 305 may increase the separation distance, measured in a radial direction radial to the axis of rotation, between backiron 610 and the teeth ends of the teeth of stator 620. This increased separation may in turn reduce the amplitude of higher-order spatial harmonics in the magnetic flux generated by rotor 605, which higher-order spatial harmonics may contribute to degrading the performance of motor 600.

While motor 600 is shown as comprising devices 300 to act as permanent magnets, it is contemplated that motor 600 may use device 100 or the other devices described herein, in addition to or instead of devices 300. Moreover, FIGS. 6 and 7 show that in motor 600 the longitudinal direction of the trenches of devices 300 is about parallel to the axis of rotation of the rotor. It is contemplated that in some examples the longitudinal direction of the trenches of the devices used as permanent magnets in the rotor need not be parallel to the axis of rotation of the rotor.

Figure 9:
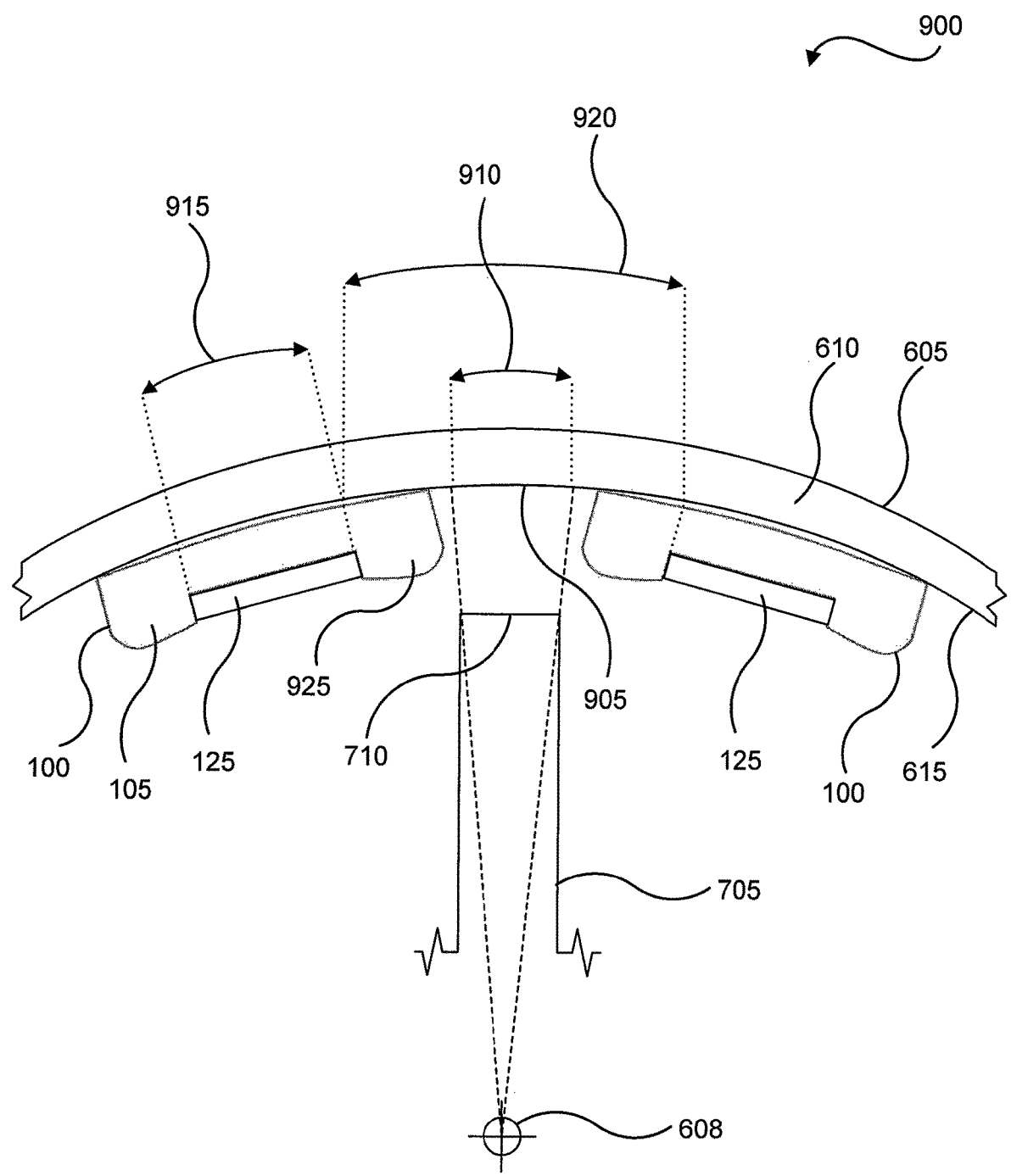
FIG. 9 shows a partial cross-sectional view of another example electric motor, in accordance with a non-limiting implementation of the present specification.

Turning now to FIG. 9, a partial cross-sectional view is shown of an example electric motor 900. Motor 900 may be similar to motor 600, with one difference being that motor 900 uses devices 100 as its rotor permanent magnets, instead of devices 300 which are used in motor 600. Cross-hatchings are omitted from FIG. 9 for ease and clarity of illustration.

As shown in FIG. 9, stator tooth end 710 may have a radial projection 905 on inner surface 615 of backiron 610 of rotor 605. Projection 905 has a width 910 in the circumferential direction. The circumferential direction may be the direction that runs along the circumference of rotor 605. Similarly, high coercivity member 125 may have a radial projection on inner surface 615, which may have a width 915 in the circumferential direction. Likewise, the radial projection on inner surface 615 of the gap between high coercivity members 125 of two adjacent devices 100 may have a width 920 along the circumferential direction. In some examples, width 910 may be smaller than width 915 and width 920.

Furthermore, in some examples width 910 may be smaller than width 205 (shown in FIG. 2) of high coercivity member 125. In addition, in some examples width 910 may be smaller than the gap measured in the circumferential direction between adjacent high coercivity members 125.

To stator tooth 705 and its windings (not shown), high coercivity members 125 represent a strong magnetic field and the gap between adjacent high coercivity members represent a relatively weaker magnetic field. If width 910 were to be larger than widths 915 and 920, the radial projection of stator tooth 705 would straddle or span a strong magnetic field region and a weaker magnetic filed region at all rotational positions of rotor 605 relative to stator tooth 705. Setting width 910 to be smaller than width 915 and 920 may avoid this straddling for at least some of the rotational positions of rotor 605 relative to stator tooth 705.

In some examples, the relative circumferential widths discussed in relation to motor 900 may also apply to motor 600 and the other motors described herein. Moreover, in some examples the gap between adjacent magnetic devices secured to the rotor may comprise air or a different material. Furthermore, as shown in FIG. 9, a lateral portion 925 of device 100 may extend into the gap between adjacent high coercivity members 125. The material of member 105 may have a magnetic coercivity lower than the magnetic coercivity of high coercivity members 125. As such, lateral portion 925 may present a magnetic coercivity, and a corresponding magnetic field strength, that is intermediate between those of the high coercivity member and those of the gap between the adjacent high coercivity members. In this manner, in some examples the extension of lateral portion 925 in the gap between high coercivity portions may contribute to shaping or smoothing out the magnetic flux profile along the circumferential direction between the high coercivity members and the gap.

The shapes of the high and low coercivity members of the devices that are used as the magnets in the rotor, and their relative positions on the inner surface of the rotor, may be adjusted to tailor the magnetic flux profile along the circumferential direction of the rotor. Moreover, in FIG. 9 a small space or gap is shown between device 100 and inner surface 615 of backiron 610. This space or gap is for illustrative purposes, and it is contemplated that in some examples devices 100 may be flush against inner surface 615. Moreover, in some examples the side or surface of member 105 proximal to inner surface 615 may have a shape or curvature complementary to the shape or curvature of inner surface 615. This in turn may allow devices 100 to be flush against inner surface 615.

Figure 10:
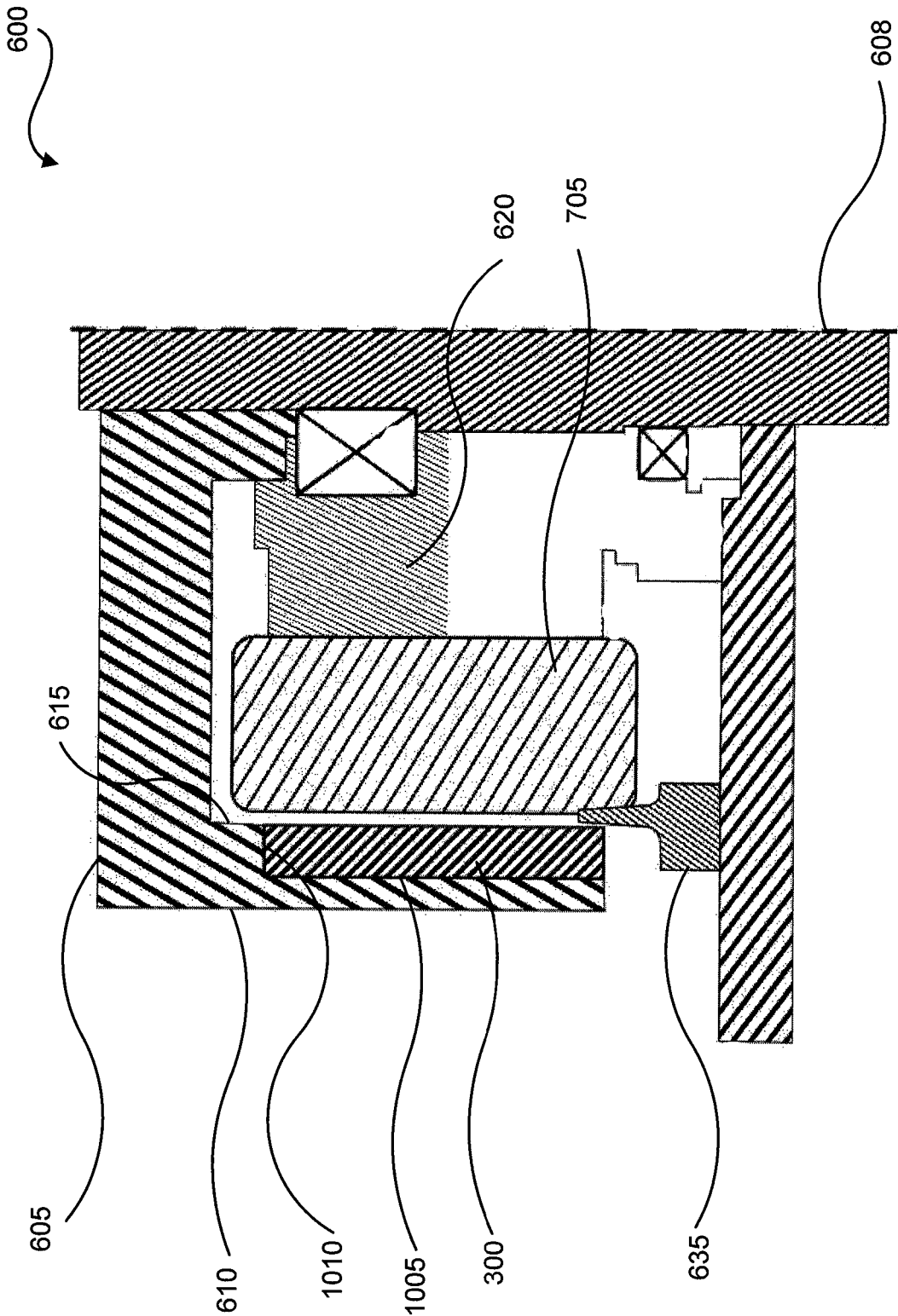
FIG. 10 shows another partial cross-sectional view of the motor of FIG. 6.

Turning now to FIG. 10, a partial cross-sectional view is shown of motor 600. The cross-section is taken along a plane that encompasses axis of rotation 608. As shown in FIG. 10, backiron 610 may comprise a channel 1005 in inner surface 615. Channel 1005 may define a longitudinal direction running along channel 1005. In some examples, this longitudinal direction may be about parallel to axis of rotation 608. Moreover, channel 1005 may terminate in a shoulder 1010 formed in backiron 610. Shoulder 1010 may define an end or backstop of channel 1005.

Figure 11:
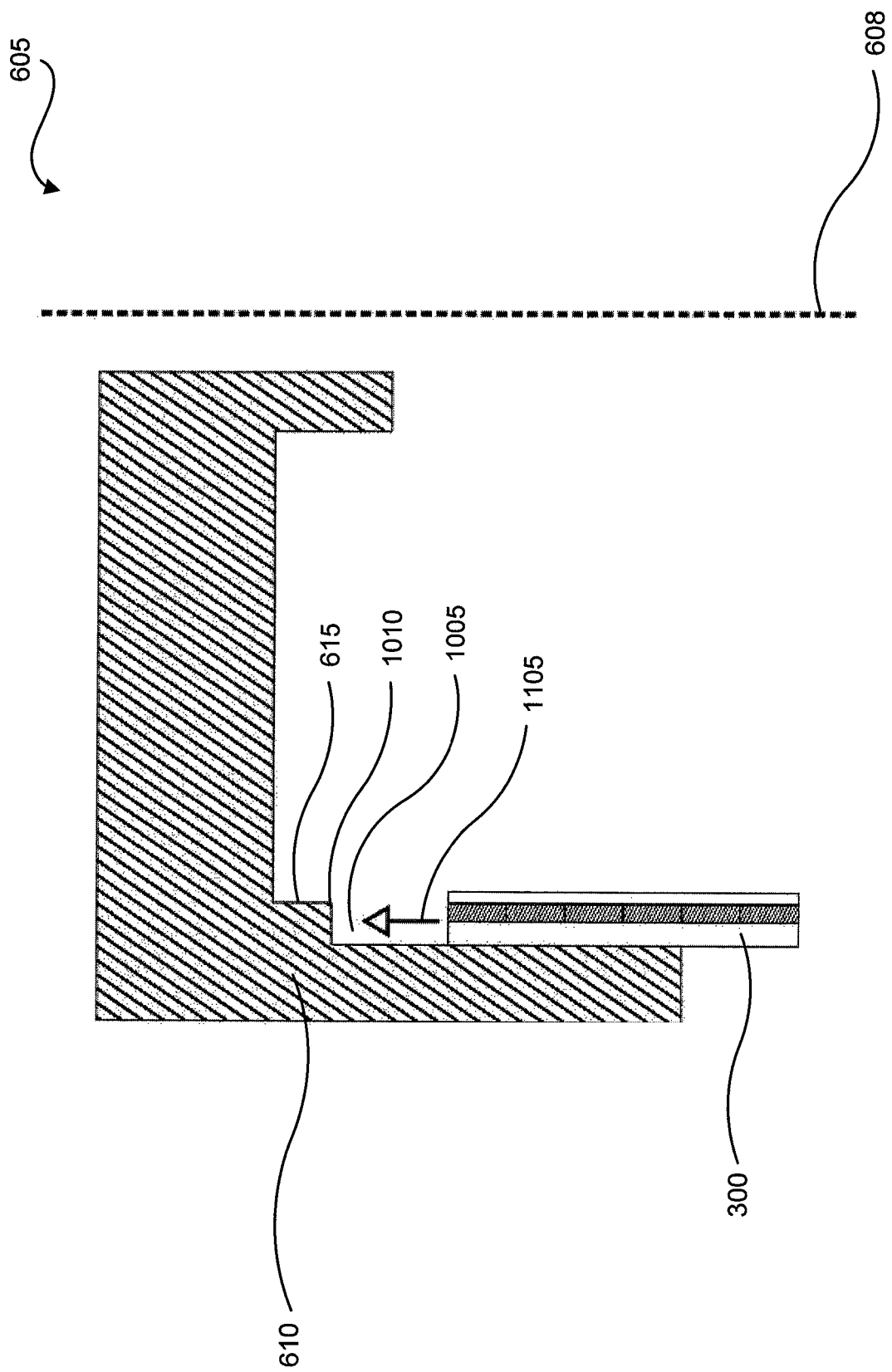
FIG. 11 shows a partial cross-sectional view of the rotor of the motor of FIG. 6.

Channel 1005 may be shaped and sized to receive device 300. In addition, the position of channel 1005 in backiron 610 may allow device 300 to be aligned in the axial direction relative to the stator teeth. For example, channel 1005 may be used to center device 300 in the axial direction relative to tooth 705. In addition, FIG. 11 shows a partial cross-sectional view of rotor 605. Device 300 may be received or slid along direction 1105 in channel 1005 into its position in rotor 605. In some examples, direction 1105 may be about parallel to axis of rotation 608. While channel 1005 is described as extending along a longitudinal direction about parallel to the axis of rotation, it is contemplated that in some examples the channel in backiron 610 may extend along a longitudinal direction that need not be parallel to the axis of rotation.

Figure 12:
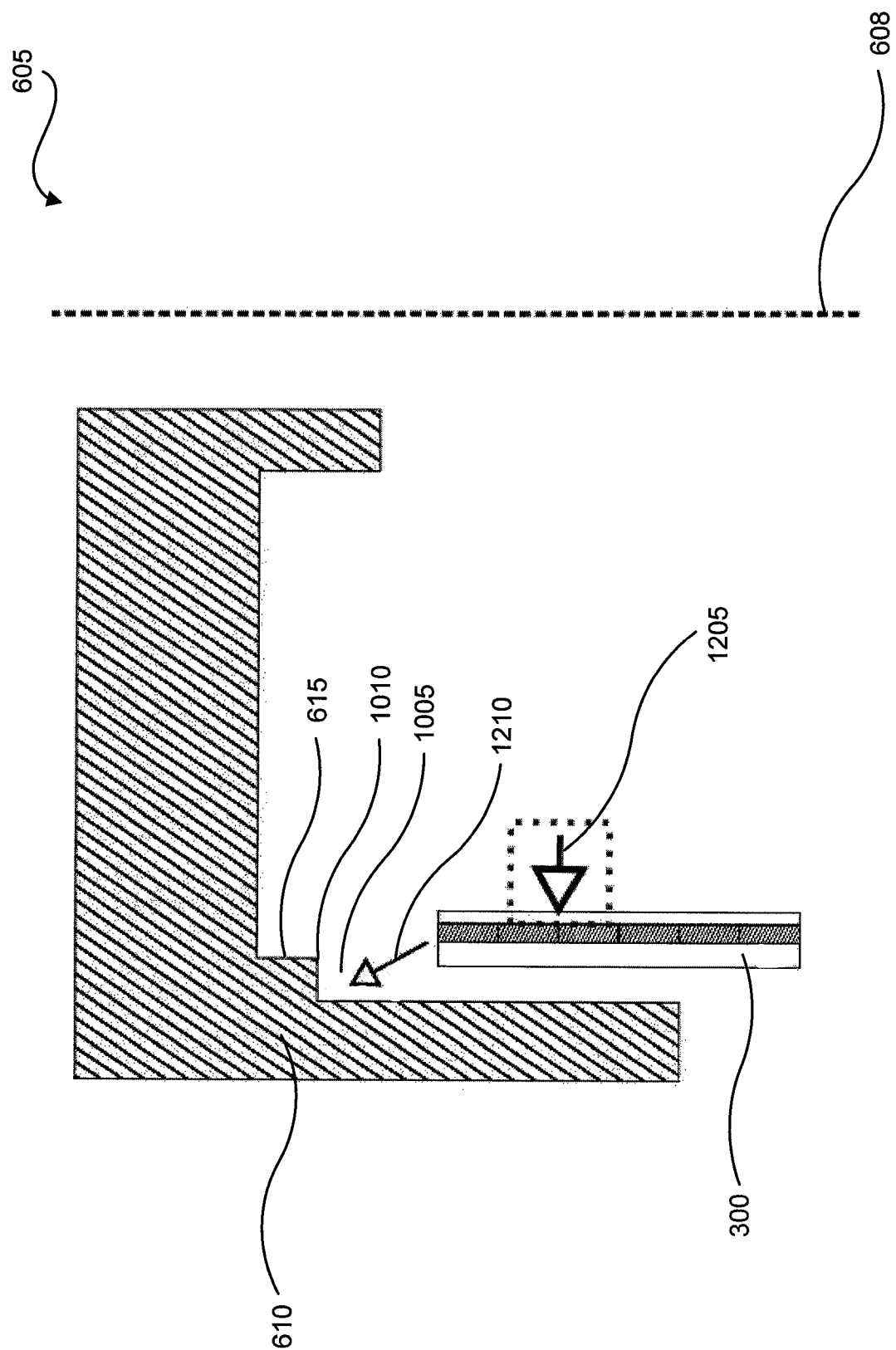
FIG. 12 shows a partial cross-sectional view of the rotor of the motor of FIG. 6.

To assemble rotor 605, devices 300 may be secured to backiron 610 of rotor 605. Sliding device 300 into place along channel 1005 and against inner surface 615 may avoid unexpected or unplanned movement of device 300 caused by the magnetic attractive force between device 300 and backiron 610. FIG. 12 shows a partial cross-sectional view of rotor 605, and illustrates an example direction 1205 along which magnetic attractive forces may pull device 300 towards backiron 610 if device 300 where to be moved towards backiron 610 along a direction 1210. Such magnetic attractive forces may cause pinching hazards, and may also cause device 300 to be dislodged from assembling tools when those tools approach backiron 610. Assembling rotor 600 by sliding device 300 in channel 1005 along direction 1105 may reduce the assembling challenges posed by the magnetic attractive force between device 300 and backiron 610 of rotor 605.

The features or functionalities described herein in relation to device 100, device 300, or the other devices described herein, may apply to or be present in any other one or more of device 100, device 300, and the other devices described herein. In addition, the features or functionalities described herein in relation to motor 600, motor 900, and the other motors described herein may apply to or be present in any other one or more of motor 600, motor 900, and the other motors described herein. Furthermore, device 100, device 300, or the other devices described herein may be used as magnets in any one or more of motor 600, motor 900, and the other motors described herein.

Throughout this specification and the appended claims, infinitive verb forms are often used. Examples include, without limitation: "to rotate," "to act," "to secure," "to maintain," and the like. Unless the specific context requires otherwise, such infinitive verb forms are used in an open, inclusive sense, that is as "to, at least, rotate," to, at least, act," "to, at least, secure," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A device to be used as a magnet, the device comprising:
a first member defining a trench extending along a longitudinal direction, the trench having a top being open, the first member comprising a first material being magnetizable;
a second member secured to the first member, the second member received in the trench, the second member comprising a second material being magnetizable; and
a third member secured to the first member, the third member received in the trench, the third member comprising a third material being magnetizable, the third member and the second member disposed side-by-side along the longitudinal direction;
wherein:
the trench comprises a width measured along a first direction lateral to the longitudinal direction; and
the second member and the third member span the width of the trench.

2. The device of claim 1, wherein the second material and the third material have magnetic coercivities larger than a corresponding magnetic coercivity of the first material.

3. The device of claim 2, wherein the second material is the same as the third material.

4. The device of claim 3, wherein:
the first material comprises ferrite; and
the second material and the third material comprise NdFeB.

5. The device of claim 1, wherein the device is free of a direct electrically-conductive link between the second member and the third member.

6. The device of claim 5, wherein the second member abuts the third member in the longitudinal direction.

7. The device of claim 1, further comprising at least one additional member secured to the first member, the at least one additional member received in the trench, the at least one additional member comprising a corresponding additional material being magnetizable, the at least one additional member disposed side-by-side along the longitudinal direction with the second member and the third member.

8. The device of claim 1, wherein:
the trench comprises a bottom opposite the top, the bottom being substantially planar;
the second member comprises a substantially planar surface abutting the bottom; and
the third member comprises a corresponding substantially planar surface abutting the bottom.

9. The device of claim 1, wherein:
the trench comprises:
the width measured along the first direction lateral to the longitudinal direction;
a bottom opposite the top; and
a depth measured between the top and the bottom along a second direction; and
a thickness of the first member measured along the second direction increases when moving from a first point at a lateral edge of the first member along the first direction towards a second point, a distance of the second point to the trench measured along the first direction being smaller than a corresponding distance of the first point to the trench measured along the first direction.

10. The device of claim 1, wherein the first member comprises a plurality of segments disposed side-by-side along the longitudinal direction.

11. An electric motor comprising:
a rotor to rotate about an axis of rotation defining an axial direction, the rotor comprising a backiron and a plurality of magnets secured to an inner surface of the backiron, at least one of the magnets comprising:
a first member defining a trench extending along a longitudinal direction, the trench having a top being open and a bottom opposite the top, the bottom being proximal to the inner surface and the top being distal from the inner surface, the first member comprising a first material being magnetizable as a permanent magnet;
a second member secured to the first member, the second member received in the trench, the second member comprising a second material being magnetizable as a permanent magnet; and
a third member secured to the first member, the third member received in the trench, the third member comprising a third material being magnetizable as a permanent magnet, the third member and the second member disposed side-by-side along the longitudinal direction;
a stator disposed inside the rotor and centered about the axis of rotation, the stator comprising a plurality of teeth each extending radially to the axial direction towards the inner surface of the backiron and terminating in a corresponding tooth end disposed proximal to the inner surface; and
a plurality of conductive windings each disposed around a corresponding tooth of the stator.

12. The electric motor of claim 11, wherein:
the trench comprises a width measured along a direction lateral to the longitudinal direction; and
the second member and the third member span the width of the trench.

13. The electric motor of claim 11, wherein the second material and the third material have magnetic coercivities larger than a corresponding magnetic coercivity of the first material.

14. The electric motor of claim 13, wherein:
the first material comprises ferrite; and
the second material and the third material comprise NdFeB.

15. The electric motor of claim 11, wherein the at least one of the magnets is free of a direct electrically-conductive link between the second member and the third member.

16. The electric motor of claim 15, wherein the second member abuts the third member in the longitudinal direction.

17. The electric motor of claim 11, wherein the longitudinal direction is about parallel to the axial direction.

18. The electric motor of claim 11, wherein:
a radial projection of a given tooth end on the inner surface of the backiron has a width in a circumferential direction that is smaller than a corresponding width of the second member and the third member measured along a direction lateral to the longitudinal direction.

19. The electric motor of claim 11, wherein:
a radial projection of a given tooth end on the inner surface of the backiron has a width in a circumferential direction that is smaller than a gap measured in the circumferential direction between the second member and the third member of the at least one of the magnets and a corresponding second member and a corresponding third member of a further magnet secured to the inner surface of the backiron adjacent to the at least one of the magnets.

20. A device to be used as a magnet, the device comprising:
- a first member defining a trench extending along a longitudinal direction, the trench having a top being open, the first member comprising a first material being magnetizable as a permanent magnet;
- a second member secured to the first member, the second member received in the trench, the second member comprising a second material being magnetizable as a permanent magnet; and
- a third member secured to the first member, the third member received in the trench, the third member comprising a third material being magnetizable as a permanent magnet, the third member and the second member disposed side-by-side along the longitudinal direction.

* * * * *